United States Patent
Chen et al.

(10) Patent No.: US 10,177,844 B2
(45) Date of Patent: Jan. 8, 2019

(54) MEASUREMENT METHOD AND APPARATUS FOR A RESIDUAL DIRECT-CURRENT COMPONENT AND SYSTEM

(71) Applicant: Fujitsu Limited, Kawasaki-shi, Kanagawa (JP)

(72) Inventors: Hao Chen, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/664,477

(22) Filed: Jul. 31, 2017

(65) Prior Publication Data

US 2018/0076889 A1 Mar. 15, 2018

(30) Foreign Application Priority Data

Sep. 13, 2016 (CN) .......................... 2016 1 0822048

(51) Int. Cl.
*H04B 10/079* (2013.01)
*H04B 10/61* (2013.01)

(52) U.S. Cl.
CPC ............... *H04B 10/07955* (2013.01); *H04B 10/07953* (2013.01); *H04B 10/614* (2013.01); *H04B 10/616* (2013.01)

(58) Field of Classification Search
CPC ...... H04N 19/11; H04N 19/14; H04N 19/176; H04W 56/0035; H04B 10/07955; H04B 10/07953; H04B 10/616; H04B 10/614; H04L 1/0045
USPC ........................................................ 398/38
See application file for complete search history.

(56) References Cited

U.S. PATENT DOCUMENTS

| | | | |
|---|---|---|---|
| 5,583,597 A | 12/1996 | Enomoto | |
| 9,059,805 B2 | 6/2015 | Mak et al. | |
| 2002/0158871 A1 | 10/2002 | Evankow, Jr. et al. | |
| 2009/0284262 A1 | 11/2009 | Wand | |
| 2015/0255029 A1* | 9/2015 | Niikura | G09G 3/3648 345/98 |
| 2015/0280862 A1* | 10/2015 | Teplitsky | H04L 1/0045 375/319 |

(Continued)

FOREIGN PATENT DOCUMENTS

| | | |
|---|---|---|
| CN | 102054272 | 5/2011 |
| CN | 105450295 | 3/2016 |

*Primary Examiner* — Don N Vo
(74) *Attorney, Agent, or Firm* — Staas & Halsey LLP

(57) ABSTRACT

A measurement method and apparatus for a residual direct-current component and a system where the measurement method for a residual direct-current component includes: selecting a section of data of a first predetermined length from a received signal; performing fast Fourier transform on the selected data to obtain a frequency-domain signal of the data; calculating a power spectrum of the frequency-domain signal of the transformed data; and finding out a maximum peak value of the power spectrum in a frequency offset range, and taking power of the maximum peak value as power of the residual direct-current component. With the embodiments of this disclosure, a residual direct-current component of an optical transmitter may be measured at a receiver end of a coherent optical communication system, thereby avoiding a diagnosis error of a communication network, and improving performance of the communication system.

10 Claims, 5 Drawing Sheets

(56) References Cited

U.S. PATENT DOCUMENTS

2016/0013863 A1 1/2016 Dou
2016/0261398 A1* 9/2016 Liao .......................... H04L 5/04

* cited by examiner

MEASUREMENT METHOD AND APPARATUS FOR A RESIDUAL DIRECT-CURRENT COMPONENT AND SYSTEM

CROSS-REFERENCE TO RELATED APPLICATIONS

This application claims the benefit of Chinese Application No. 201610822048.X, filed Sep. 13, 2016, in the Chinese Intellectual Property Office, the disclosure of which is incorporated herein by reference.

BACKGROUND

1. Field

This disclosure relates to the field of communication technologies, and in particular to a measurement method and apparatus for a residual direct-current component of an optical transmitter and a system.

2. Description of the Related Art

In an optical communication system, direct-current components of an optical transmitter will result in a relatively large cost on final signal recovery and communication quality after passing through transmission links and being processed by an optical receiver. And as improvement of a communication rate and complexity of a network state, influence of such a cost will become more and more prominent.

In the prior art, the direct-current components of the optical transmitter may be reduced as possible by flexibly configuring a bias of a modulator of a coherent transmitter, thereby lowering the influence of the direct-current components of the optical transmitter (Reference Document 1). However, residual direct-current components always exist, whatever any transmitter configuration method is used. On the one hand, communication quality will be degraded. And on the other hand, as sizes of the residual direct-current components of the optical transmitter are unknown, it is possible that a diagnosis error may occur in surveillance and diagnosis of a communication network, thereby resulting in impropriety of countermeasures, and affecting the performance of the communication system.

Reference Document 1: US20140308047A1.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the embodiments.

It was found by the inventors in the implementation of this disclosure that as a size of a residual direct-current component of an optical transmitter is unknown, the residual direct-current component received at an optical receiver end may result in a diagnosis error of a communication network, thereby affecting the performance of the communication system.

In order to solve the above problem, this application proposes a measurement method and apparatus for a residual direct-current component of an optical transmitter and a system.

According to a first aspect of the embodiments of this disclosure, there is provided a measurement method for a residual direct-current component, applicable to a single-polarization optical communication system; wherein, the measurement method includes: a section of data of a first predetermined length is selected from a received signal; fast Fourier transform is performed on the selected data to obtain a frequency-domain signal of the data; a power spectrum of the frequency-domain signal of the transformed data is calculated; and a maximum peak value of the power spectrum is found out in a frequency offset range, and power of the maximum peak value is taken as power of the residual direct-current component.

According to a second aspect of the embodiments of this disclosure, there is provided a measurement method for residual direct-current components, applicable to a dual-polarization optical communication system; wherein, the measurement method includes: a section of data of a first predetermined length is selected respectively from received signals in two polarization states; fast Fourier transform is performed on the two sections of selected data to obtain frequency-domain signals of the two sections of data; power spectra of the frequency-domain signals of the transformed two sections of data are calculated, and the calculated two power spectra are added up; and a maximum peak value of an added power spectrum is found out in a frequency offset range, and power of the maximum peak value is taken as a sum of power of the residual direct-current components.

According to a third aspect of the embodiments of this disclosure, there is provided a measurement method for residual direct-current components, applicable to a dual-polarization optical communication system; wherein, the measurement method includes: a sum of power of residual direct-current components in two polarization states is measured; a difference between the power of the residual direct-current components in the two polarization states is measured; and power of residual direct-current component in each polarization state of an optical transmitter is calculated according to the sum of power and the difference between the power.

According to a fourth aspect of the embodiments of this disclosure, there is provided a measurement apparatus for a residual direct-current component, applicable to a single-polarization optical communication system; wherein, the measurement apparatus includes: a selecting unit configured to select a section of data of a first predetermined length from a received signal; a transforming unit configured to perform fast Fourier transform on the data selected by the selecting unit to obtain a frequency-domain signal of the data; a calculating unit configured to calculate a power spectrum of the frequency-domain signal of the data transformed by the transforming unit; and a determining unit configured to find out a maximum peak value of the power spectrum in a frequency offset range, and take power of the maximum peak value as power of the residual direct-current component.

According to a fifth aspect of the embodiments of this disclosure, there is provided a measurement apparatus for residual direct-current components, applicable to a dual-polarization optical communication system; wherein, the measurement apparatus includes: a selecting unit configured to select a section of data of a first predetermined length respectively from received signals in two polarization states; a transforming unit configured to perform fast Fourier transform on the two sections of data selected by the selecting unit to obtain frequency-domain signals of the two sections of data; a calculating unit configured to calculate power spectra of the frequency-domain signals of the two sections of data transformed by the transforming unit, and add up the calculated two power spectra; and a determining unit configured to find out a maximum peak value of an added power spectrum in a frequency offset range, and take power of the maximum peak value as a sum of power of the residual direct-current components.

According to a six aspect of the embodiments of this disclosure, there is provided a measurement apparatus for residual direct-current components, applicable to a dual-polarization optical communication system; wherein, the measurement apparatus includes: a first measuring unit configured to measure a sum of power of residual direct-current components in two polarization states; a second measuring unit configured to measure a difference between the power of the residual direct-current components in the two polarization states; and a calculating unit configured to calculate power of residual direct-current component in each polarization state of an optical transmitter according to the sum of power measured by the first measuring unit and the difference between the power measured by the second measuring unit.

According to a seventh aspect of the embodiments of this disclosure, there is provided a receiver, including the apparatus as described in any one of the aspects 4-6.

According to an eighth aspect of the embodiments of this disclosure, there is provided an optical communication system, including a transmitter and a receiver, and further including the apparatus as described in any one of the aspects 4-6.

An advantage of the embodiments of this disclosure exists in that with the embodiments of this disclosure, a residual direct-current component of an optical transmitter may be measured at a receiver end of an optical communication system, thereby avoiding a diagnosis error of a communication network, and improving performance of the communication system. And by measuring the residual direct-current component at the receiver end, topology and software and hardware configuration of an existing network will not be changed, which is applicable to a coherent optical communication system of any modulation format.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiments of this disclosure provide a measurement method and apparatus for a residual direct-current component of an optical transmitter and a system. In the method, a residual direct-current component in an optical transmitter is measured by analyzing a signal received by an optical receiver. As the residual direct-current component is measured at a receiver end in the method, topology and software and hardware configuration of an existing network will not be changed, no extra influence will be posed on an existing communication system. And this method is applicable to a coherent optical communication system of any modulation format, such as phase shift keying (PSK), and quadrature amplitude modulation (QAM), etc.

Various implementations of the embodiments of this disclosure will be described below with reference to the accompanying drawings. These implementations are illustrative only, and are not intended to limit the embodiments of this disclosure.

Embodiment 1

This embodiment provides a measurement method for a residual direct-current component, applicable to a single-polarization coherent optical communication system.

Figure 1:
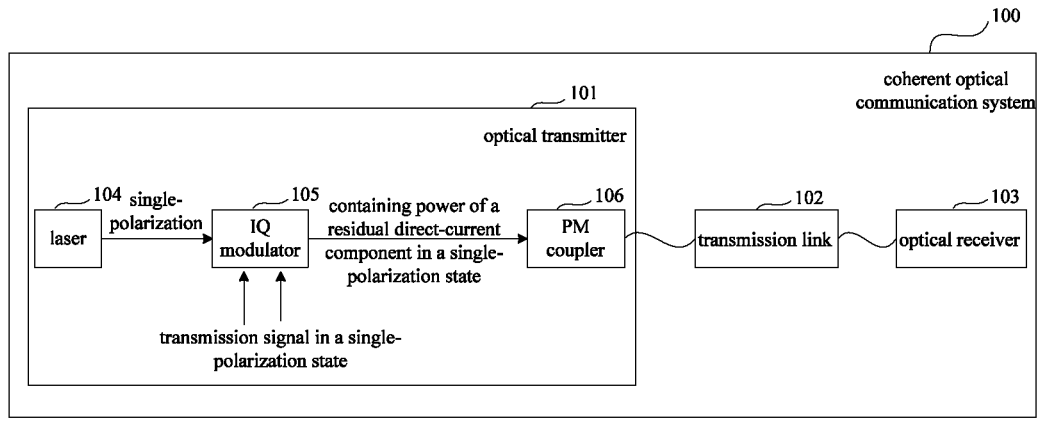
FIG. 1 is a schematic diagram of a single-polarization coherent optical communication system 100.

FIG. 1 is a schematic diagram of a single-polarization coherent optical communication system 100. As shown in FIG. 1, the coherent optical communication system 100 includes an optical transmitter 101, an optical receiver 103 and a transmission link 102. In this embodiment, the optical transmitter 101 includes a laser 104 outputting a single-polarization optical signal, an IQ modulator 105, and a PM coupler 106, etc. As hardware or configuration of the optical transmitter 101 is not ideal, a signal after being modulated by the IQ modulator 105 contains a residual direct-current component, and the signal containing the residual direct-current component is received by the optical receiver 103 after passing through the transmission link 102. By processing the signal received by the optical receiver 103 at a receiver end by using the method of this embodiment, the residual direct-current component may be measured and then may be used for analysis of transmission BER (Bit Error Rate) performance, etc., thereby improving performance of the system.

Figure 2:
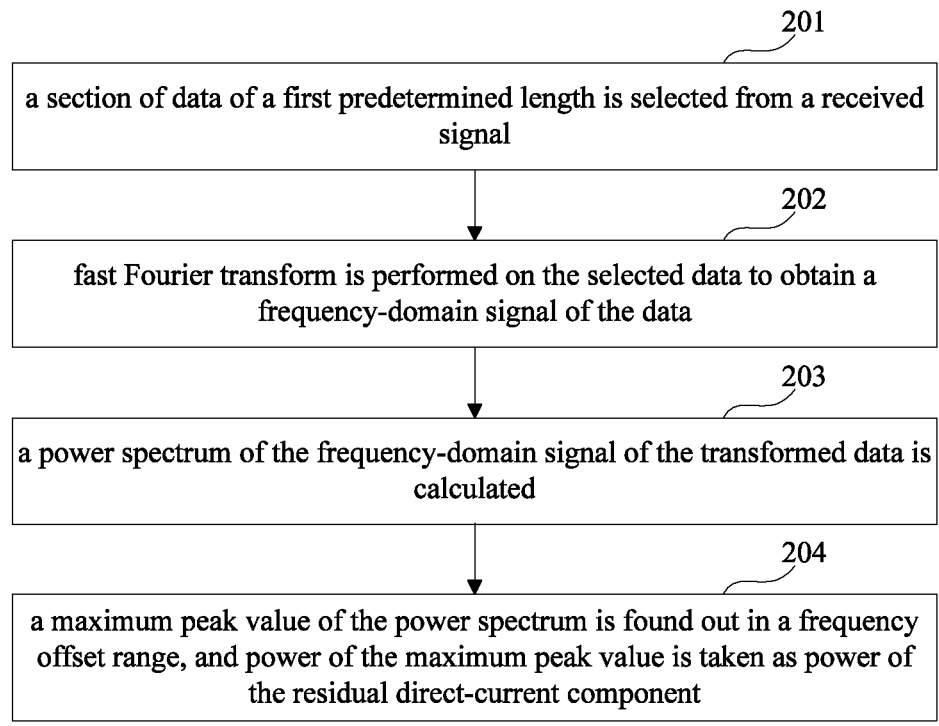
FIG. 2 is a flowchart of a measurement method for a residual direct-current component of Embodiment 1 of this disclosure.

FIG. 2 is a flowchart of a measurement method for a residual direct-current component of this embodiment. As shown in FIG. 2, the method includes:

step 201: a section of data of a first predetermined length is selected from a received signal;

step 202: fast Fourier transform is performed on the selected data to obtain a frequency-domain signal of the data;

step 203: a power spectrum of the frequency-domain signal of the transformed data is calculated; and step 204: a maximum peak value of the power spectrum is found out in a frequency offset range, and power of the maximum peak value is taken as power of the residual direct-current component.

In this embodiment, the power of the residual direct-current component is measured by using the method of finding out a maximum peak in a frequency domain. As the measurement is performed at the receiver end, topology and software and hardware configuration of the network will not to be changed, and no extra influence will be posed on an existing optical communication system. After the power of the residual direct-current components is measured by using the method of this embodiment, it may be applied to analysis of BER performance etc., thereby improving performance of the system.

In step 201, a section of data of a first predetermined length may be selected from the received signal. The received signal here is received from the optical receiver. Selection of the first predetermined length here is related to a size of phase noise and resolution of subsequent frequency domain processing, which is required to be appropriate in size. For example, the first predetermined length should not be too large, which needs to be less than a change period of phase noise of the optical communication system; however, the first predetermined length should not be too small, which needs to ensure an enough spectral resolution, that is, the selection of the first predetermined length needs to ensure that the spectral resolution is within a certain range. For example, for an optical communication system of a symbol rate of 30 G, the selection of the first predetermined length needs to ensure that the spectral resolution may be a value between 1 MHz and 100 MHz.

In step 202, fast Fourier transform may be performed on the selected data to obtain a frequency-domain signal of the data. The prior art may be referred to for a particular transform method, which will not be described herein any further.

In steps 203-204, a power spectrum of the frequency-domain signal may be calculated, and the maximum peak value of the power spectrum is found out in the frequency offset range, and its power is taken as the power of the residual direct-current component.

In this embodiment, a method for calculating the power spectrum of the frequency-domain signal is not limited, and the prior art may be referred to.

In this embodiment, the frequency offset range refers to a range of a difference between frequencies of an oscillator laser and a carrier laser in the coherent optical communication system, and its empirical value may be, for example, 0 Hz-1 GHz.

In this embodiment, the prior art may be referred to for a method for finding the maximum peak value of the power spectrum in the frequency offset range, which will not be described herein any further.

In this embodiment, power of the above maximum peak value is the power of the residual direct-current component, may be expressed as:

$$Pa = P_{X,N1}(f0);$$

where, X is the above received signal, N1 is the above first predetermined length, and f0 is a frequency at the position of the above maximum peak value.

With the measurement method of the embodiment of this disclosure, power of a residual direct-current component of an optical transmitter may be measured at a receiver end of a single-polarization coherent optical communication system, thereby performing diagnosis and adjustment on the performance change of a communication network by estimating influence of the power of the residual direct-current component of the optical transmitter on BER performance, which may avoid a diagnosis error of the communication network, and improve the performance of a communication system. And by measuring the residual direct-current component by using the method, it not only will not change topology and software and hardware configuration of an existing network, but also is applicable to a coherent optical communication system of any modulation format.

Embodiment 2

This embodiment provides a measurement method for residual direct-current components, applicable to a dual-polarization coherent optical communication system.

Figure 3:
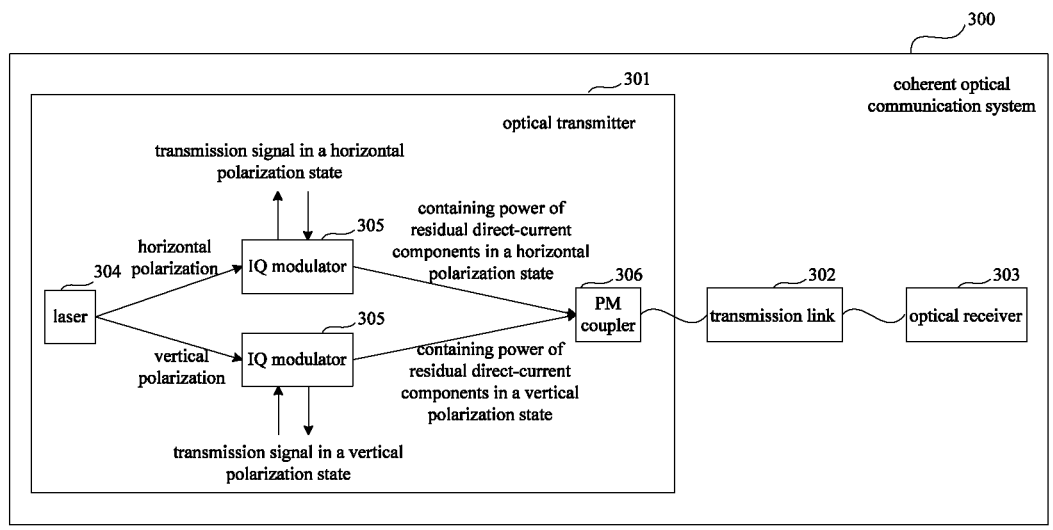
FIG. 3 is a FIG. 1 is a schematic diagram of a dual-polarization coherent optical communication system 300.

FIG. 3 is a schematic diagram of a dual-polarization coherent optical communication system 300. As shown in FIG. 3, the coherent optical communication system 300 includes an optical transmitter 301, an optical receiver 303 and a transmission link 302. In this embodiment, the optical transmitter 301 includes a laser 304 outputting dual-polarization optical signals, an IQ modulator 305, and a PM coupler 306, etc. As hardware or configuration of the optical transmitter 301 is not ideal, signals after being modulated by the IQ modulator 305 contain residual direct-current components in a horizontal polarization state and a vertical polarization state, and the signals containing the residual direct-current components are received by the optical receiver 303 after passing through the transmission link 302. By processing the signals received by the optical receiver 303 at a receiver end by using the method of this embodiment, the residual direct-current components may be measured and then may be used for analysis of BER performance etc., thereby improving performance of the system.

Figure 4:
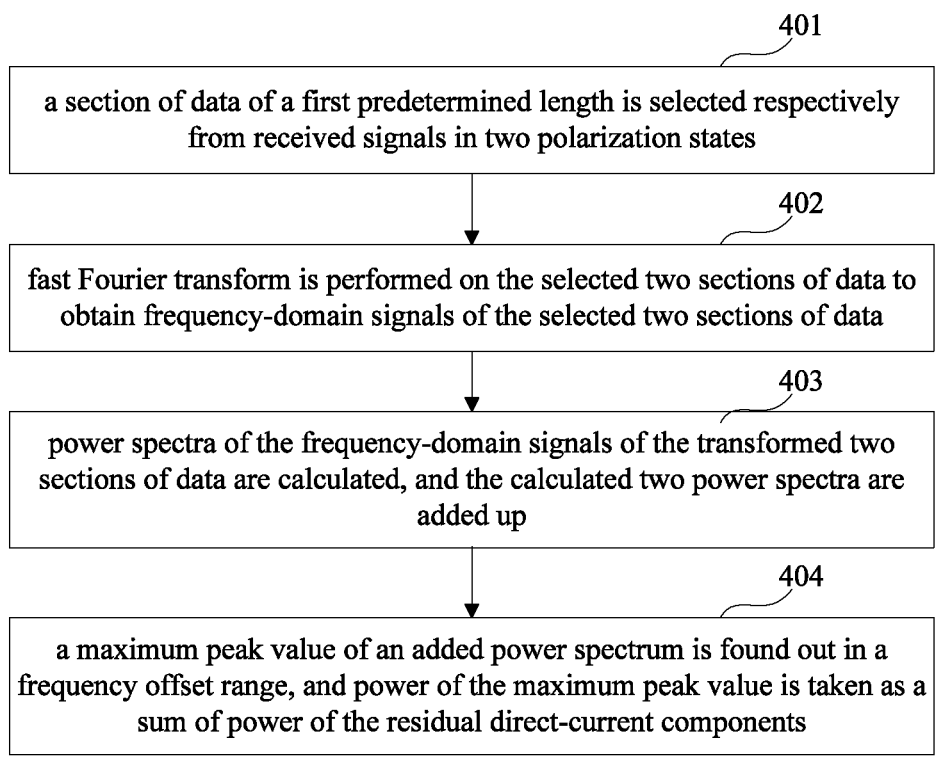
FIG. 4 is a flowchart of a measurement method for residual direct-current components of Embodiment 2 of this disclosure.

FIG. 4 is a flowchart of a measurement method for residual direct-current components of this embodiment. As shown in FIG. 4, the method includes:

step 401: a section of data of a first predetermined length is selected respectively from received signals in two polarization states;

step 402: fast Fourier transform is performed on the selected two sections of data to obtain frequency-domain signals of the selected two sections of data;

step 403: power spectra of the frequency-domain signals of the transformed two sections of data are calculated, and the calculated two power spectra are added up; and step 404: a maximum peak value of an added power spectrum is found out in a frequency offset range, and power of the maximum peak value is taken as a sum of power of the residual direct-current components.

In this embodiment, the sum of the power of the residual direct-current components is measured by using the method of finding out a maximum peak in a frequency domain. As the measurement is performed at the receiver end, topology and software and hardware configuration of the network will not to be changed, and no extra influence will be posed on an existing optical communication system. After the sum of the power of the residual direct-current components is measured by using the method of this embodiment, it may be applied to analysis of BER performance etc., thereby improving performance of the system.

In step 401, a section of data of the first predetermined length may be selected respectively from the received signals in the two polarization states. The polarization states here refer to a horizontal polarization state and a vertical polarization state, and the received signals in the two polarization states here are received from the optical receiver.

In step 402, fast Fourier transform may be respectively performed on the selected two sections of data to obtain the frequency-domain signals of the selected two sections of data.

Steps 401-402 differ from steps 201-202 in Embodiment 1 only in that steps 201-202 in Embodiment 1 are related only to selection and transform of the single-polarization received signal, while steps 401-402 are related to respective selection and transform of received signals in two polarization states. Selection of the first predetermined length and a particular transform method are identical to those in Embodiment 1, and will not be described herein any further.

In steps 403-404, the power spectra of the frequency-domain signals of the data may be calculated, and the calculated two power spectra may be added up to obtain an added power spectrum; then a maximum peak value of the added power spectrum is found out in the frequency offset range, and its power is taken as the sum of the power of the residual direct-current components.

In this embodiment, a method for calculating the power spectra of the frequency-domain signals and a method for finding out a maximum peak value of the power spectrum in the frequency offset range are identical to those in Embodiment 1, for which the prior art may be referred to, and will not be described herein any further.

In this embodiment, power Pa of the above maximum peak value may be expressed as:

$$Pa = P_{XY,N1}(f0);$$

where, X and Y are the above received signals in the two polarization states, N1 is the above first predetermined length, and f0 is a frequency at the position of the above maximum peak value.

In this embodiment, the power Pa of the above maximum peak value may be taken as a sum of the power $md_H$ of the residual direct-current component in the horizontal polarization state and the power $md_V$ of the residual direct-current component in the vertical polarization state, that is, $Pa = md_H + md_V$.

In this embodiment, after the sum of the power of the residual direct-current components of the optical transmitter in the two polarization states is obtained, the power of the residual direct-current components of the optical transmitter in the two polarization states may be obtained by using an existing manner. Particular means is not limited in this embodiment; for example, a difference between the power of the residual direct-current components of the optical transmitter in the two polarization states may be obtained by using an existing manner, and then the power of the residual direct-current components of the optical transmitter in the two polarization states may be obtained finally in combination of the sum of the power.

With the measurement method of the embodiment of this disclosure, power of residual direct-current components of an optical transmitter in the two polarization states may be measured at a receiver end of the coherent optical communication system, thereby performing diagnosis and adjustment on the performance change of a communication network by estimating influence of the power of the residual direct-current components of the optical transmitter on BER performance, which may avoid a diagnosis error of the communication network, and improve the performance of a communication system. And by measuring the residual direct-current components by using the measurement method, it not only will not change topology and software and hardware configuration of an existing network, but also is applicable to a coherent optical communication system of any modulation format.

Embodiment 3

This embodiment provides a measurement method for residual direct-current components, applicable to a dual-polarization coherent optical communication system 300 shown in FIG. 3. By processing the signal received by the optical receiver 303 at a receiver end by using the method of this embodiment, the residual direct-current components may be measured and then may be used for analysis of BER performance etc., thereby improving performance of the system.

Figure 5:
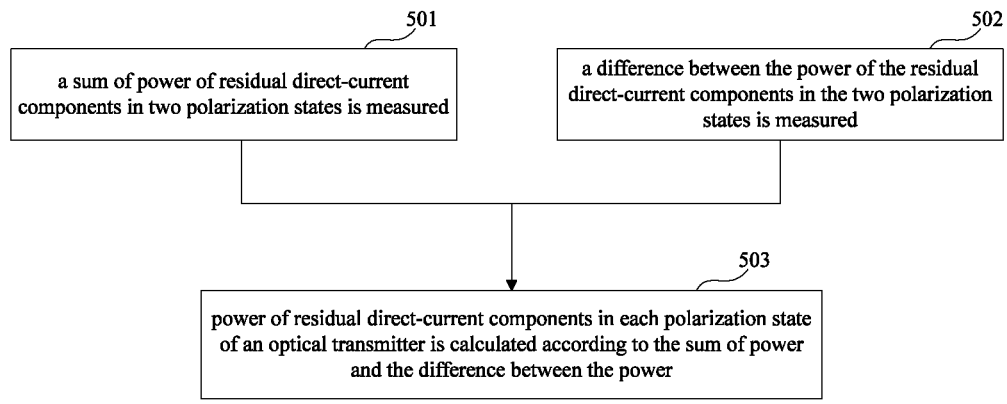
FIG. 5 is a flowchart of a measurement method for residual direct-current components of Embodiment 3 of this disclosure.

FIG. 5 is a flowchart of the measurement method for residual direct-current components of this embodiment. As shown in FIG. 5, the method includes:

step 501: a sum of power of residual direct-current components in two polarization states is measured;

step 502: a difference between the power of the residual direct-current components in the two polarization states is measured; and step 503: power of residual direct-current component in each polarization state of an optical transmitter is calculated according to the sum of power and the difference between the power.

In an embodiment, step 501 may be carried out by using the method of Embodiment 2, the contents of which being incorporated herein, and being not going to be described herein any further.

In an embodiment, the prior art may be referred to for step 502, which will not be described herein any further.

In step 503, after the sum Pa of the power of the residual direct-current components in the two polarization states and the difference Pb between the power of the residual direct-current components in the two polarization states are obtained, the power $md_H$ of the residual direct-current component in the horizontal polarization state and the power $md_V$ of the residual direct-current component in the vertical polarization state may be obtained, which are expressed as:

$$md_H = \frac{Pa + Pb}{2}$$
$$md_v = \frac{Pa - Pd}{2}.$$

With the measurement method of the embodiment of this disclosure, the power of the residual direct-current components of the optical transmitter may be measured according to the sum of power and the difference between power of the residual direct-current components of the optical transmitter in the two polarization states measured at the receiver end of the coherent optical communication system, thereby avoiding a diagnosis error of a communication network by subsequent processing, and improving the performance of the communication system. And by measuring the residual direct-current components by using the measurement method, it not only will not change topology and software and hardware configuration of an existing network, but also is applicable to a coherent optical communication system of any modulation format.

The measurement method for a residual direct-current component of the transmitter is described in above embodiments 1, 2 and 3, by which the power of the residual direct-current component of the transmitter is obtained, and a ratio of power of signal to the power of the residual direct-current component may further be calculated accordingly. As the ratio is related to transmission characteristic, the method may be applicable to measurement and analysis of BER performance, thereby improving the performance of the system.

Taking a dual-polarization optical communication system as an example, in this embodiment, power $Ps_H$ and $Ps_V$ of signals in the two polarization states may further be measured, and based on the power of the residual direct-current components in the two polarization states, the ratios of the power of signals to the power of the residual direct-current components may be obtained.

In this embodiment, the above ratios $R_H$ and $R_V$ of the power of signals to the power of the residual direct-current components may be expressed as:

$$R_H = Ps_H/md_H,$$

$$R_V = Ps_V/md_V;$$

where, $Ps_H$ is the power of the signal in the horizontal state, $Ps_V$ is the power of the signal in the vertical state, $md_H$ is the power of the residual direct-current component in the horizontal polarization state, and $md_V$ is the power of the residual direct-current component in the vertical polarization state.

In this embodiment, a ratio R of power of total signals to power of total residual direct-current components in the two polarization states may be expressed as $$R = (Ps_H + Ps_V)/(md_H + Md_V).$$

A method for measuring the power $Ps_H$ and $Ps_V$ of the signals in the two polarization states is not limited in this embodiment, and existing means may be employed, which will not be described herein any further.

Embodiment 4

This embodiment provides a measurement apparatus for a residual direct-current component, applicable to the single-polarization coherent optical communication system 100 shown in FIG. 1. As principles of the apparatus for solving problems are similar to that of the method of Embodiment 1, the implementation of the method of Embodiment 1 may be referred to for implementation of the apparatus, with identical contents being not going to be described herein any further.

Figure 6:
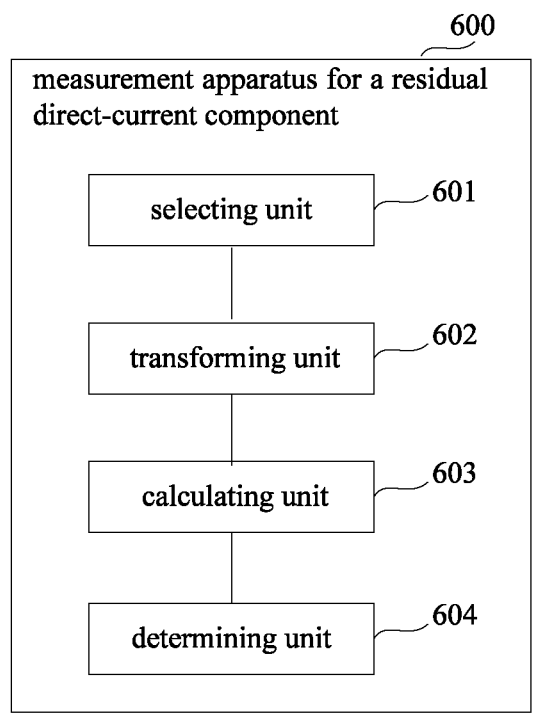
FIG. 6 is a schematic diagram of a structure of a measurement apparatus 600 for a residual direct-current component of Embodiment 4 of this disclosure.

FIG. 6 is a schematic diagram of the measurement apparatus for a residual direct-current component of this embodiment. As shown in FIG. 6, the apparatus 600 may be a processor and includes:

a selecting unit 601 configured to select a section of data of a first predetermined length from a received signal;

a transforming unit 602 configured to perform fast Fourier transform on the data selected by the selecting unit 601 to obtain a frequency-domain signal of the data;

a calculating unit 603 configured to calculate a power spectrum of the frequency-domain signal of the data transformed by the transforming unit 602; and a determining unit 604 configured to find out a maximum peak value of the power spectrum in a frequency offset range, and take power of the maximum peak value as power of the residual direct-current component.

In this embodiment, as described above, a principle for selecting the first predetermined length is: the first predetermined length is less than a change period of phase noise of the optical communication system, and the selection of the first predetermined length ensures that a spectral resolution is in a certain range.

With the measurement apparatus of the embodiment of this disclosure, power of a residual direct-current component of an optical transmitter may be measured at a receiver end of a single-polarization coherent optical communication system, thereby performing diagnosis and adjustment on the performance change of a communication network by estimating influence of the power of the residual direct-current component of the optical transmitter on BER performance, which may avoid a diagnosis error of the communication network, and improve the performance of the communication system. And by measuring the residual direct-current component by using the apparatus, it not only will not change topology and software and hardware configuration of an existing network, but also is applicable to a coherent optical communication system of any modulation format.

Embodiment 5

This embodiment provides a measurement apparatus for residual direct-current components, applicable to the dual-polarization coherent optical communication system 300 shown in FIG. 3. As principles of the apparatus for solving problems are similar to that of the method of Embodiment 2, the implementation of the method of Embodiment 2 may be referred to for implementation of the apparatus, with identical contents being not going to be described herein any further.

Figure 7:
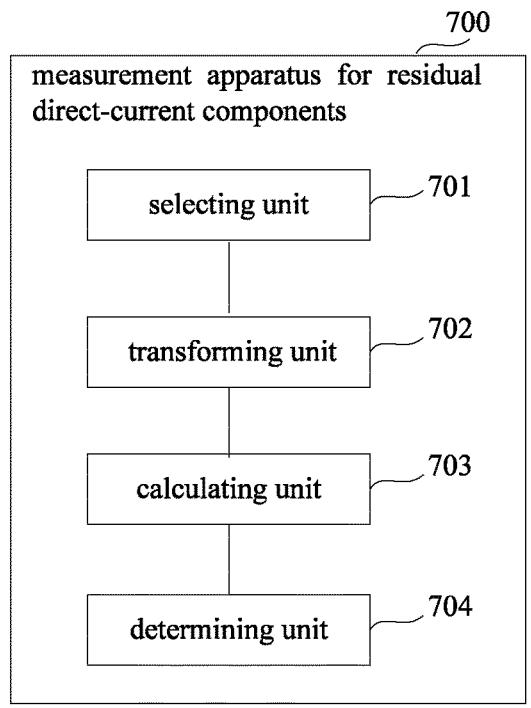
FIG. 7 is a schematic diagram of a structure of a measurement apparatus 700 for residual direct-current components of Embodiment 5 of this disclosure.

FIG. 7 is a schematic diagram of the measurement apparatus for residual direct-current components of this embodiment. As shown in FIG. 7, the apparatus 700 may be a processor and includes:

a selecting unit 701 configured to select a section of data of a first predetermined length respectively from received signals in two polarization states;

a transforming unit 702 configured to perform fast Fourier transform on the two sections of data selected by the selecting unit 701 to obtain frequency-domain signals of the two sections of data;

a calculating unit 703 configured to calculate power spectra of the frequency-domain signals of the two sections of data transformed by the transforming unit 702, and add up the calculated two power spectra; and a determining unit 704 configured to find out a maximum peak value of an added power spectrum in a frequency offset range, and take power of the maximum peak value as a sum of power of the residual direct-current components.

In this embodiment, as described above, a principle for selecting the first predetermined length is: the first predetermined length is less than a change period of phase noise of the optical communication system, and the selection of the first predetermined length ensures that a spectral resolution is in a certain range.

In this embodiment, as described above, after the sum of the power of the residual direct-current components of the optical transmitter in the two polarization states is obtained, the power of the residual direct-current components of the optical transmitter in the two polarization states may be obtained in an existing manner, thereby performing diagnosis and adjustment on the performance change of a communication network by estimating influence of the power of the residual direct-current components of the optical transmitter on BER performance, which may avoid a diagnosis error of the communication network, and improve the performance of the communication system. And by measuring the residual direct-current components by using the apparatus, it not only will not change topology and software and hardware configuration of an existing network, but also is applicable to a coherent optical communication system of any modulation format.

Embodiment 6

This embodiment provides a measurement apparatus for residual direct-current components, applicable to the dual-polarization coherent optical communication system 300 shown in FIG. 3. As principles of the apparatus for solving problems are similar to that of the method of Embodiment 3, the implementation of the method of Embodiment 3 may be referred to for implementation of the apparatus, with identical contents being not going to be described herein any further.

Figure 8:
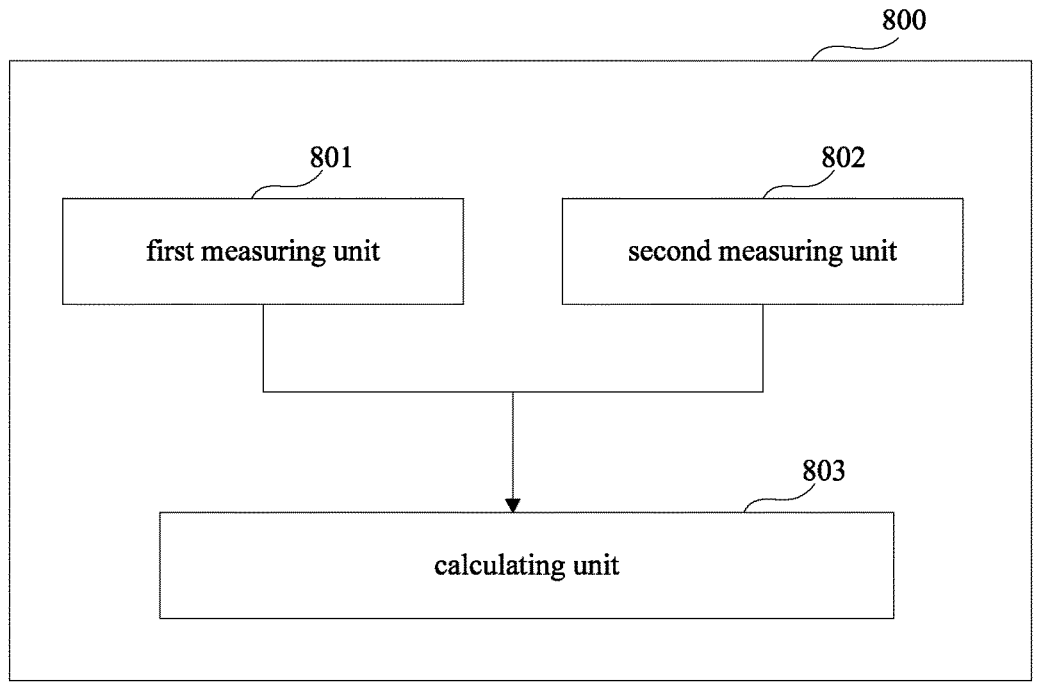
FIG. 8 is a schematic diagram of a structure of a measurement apparatus 800 for residual direct-current components of Embodiment 6 of this disclosure.

FIG. 8 is a schematic diagram of the measurement apparatus for residual direct-current components of this embodiment. As shown in FIG. 8, the apparatus 800 may be a processor and includes:

a first measuring unit 801 configured to measure a sum of power of residual direct-current components in two polarization states;

a second measuring unit 802 configured to measure a difference between the power of the residual direct-current components in the two polarization states; and a calculating unit 803 configured to calculate power of residual direct-current component in each polarization state of an optical transmitter according to the sum of power measured by the first measuring unit 801 and the difference between the power measured by the second measuring unit 802.

In this embodiment, the first measuring unit 801 may be carried out by the measurement apparatus 700 for residual direct-current components of Embodiment 5, that is, the first measuring unit 801 may include (not shown): a selecting unit configured to select a section of data of a first predetermined length respectively from received signals in the two polarization states; a transforming unit configured to perform fast Fourier transform on the two sections of data selected by the selecting unit to obtain frequency-domain signals of the two sections of data; a calculating unit configured to calculate power spectra of the frequency-domain signals of the two sections of data transformed by the transforming unit, and add up the calculated two power spectra; and a determining unit configured to find out a maximum peak value of an added power spectrum in a frequency offset range, and take power of the maximum peak value as the sum of the power of the residual direct-current components.

In this embodiment, a method for measuring the above difference between the power by the second measuring unit 802 is not limited, and the prior art may be referred to, which will not be described herein any further.

In this embodiment, a particular implementation of the calculating unit 803 is identical to that of step 503 in Embodiment 3, and will not be described herein any further.

In this embodiment, after the power of the residual direct-current components of the optical transmitter in the two polarization states is obtained, ratios of power of signals to the power of the residual direct-current components may further be calculated. As the ratios are related to transmission characteristic, it may be applicable to measurement and analysis of BER performance, thereby improving the performance of the system. In this embodiment, the ratios of power of the signals to the power of the residual direct-current components are obtained by calculating the ratios of the power $Ps_H$ and $Ps_V$ of signals in the two polarization states to the power of the residual direct-current components in the two polarization states, and a method for calculating the power $Ps_H$ and $Ps_V$ of signals in the two polarization states is not limited in this embodiment.

With the measurement apparatus of the embodiment of this disclosure, the power of the residual direct-current components of the optical transmitter in two polarization states may be accurately measured according to the sum of power and the difference between the power of the residual direct-current components of the optical transmitter in the two polarization states measured at the receiver end of the coherent optical communication system, thereby performing diagnosis and adjustment on the performance change of a communication network by estimating influence of the power of the residual direct-current components of the optical transmitter on BER performance, which may avoid a diagnosis error of the communication network, and improve the performance of the communication system. And by measuring the residual direct-current components by using the apparatus, it not only will not change topology and software and hardware configuration of an existing network, but also is applicable to a coherent optical communication system of any modulation format.

Embodiment 7

Figure 9:
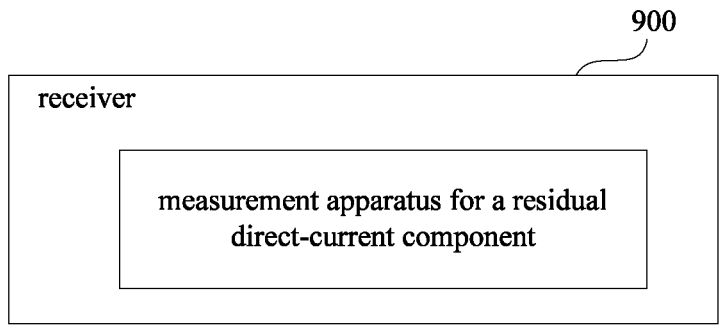
FIG. 9 is a schematic diagram of an implementation of a receiver of Embodiment 7 of this disclosure.

This embodiment provides a receiver. As shown in FIG. 9, the receiver 900 may include the measurement apparatus for a residual direct-current component as described in any one of embodiments 4, 5 and 6. As the measurement apparatus 600 for a residual direct-current component, the measurement apparatus 700 for residual direct-current components and the measurement apparatus 800 for residual direct-current components are described in detail in embodiments 4, 5 and 6, the contents of which are incorporated herein, and will not be described herein any further.

Figure 10:
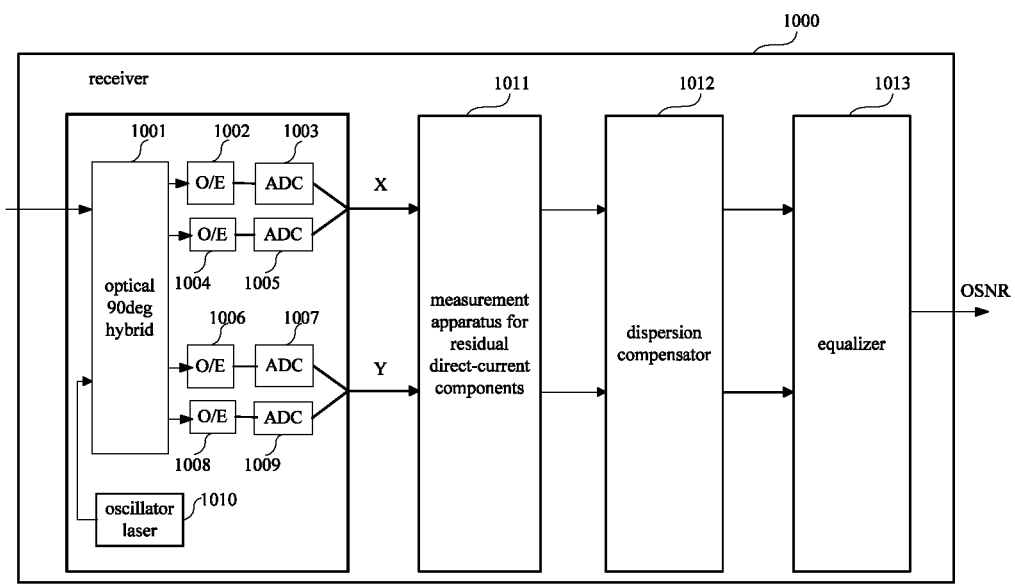
FIG. 10 is a schematic diagram of another implementation of the receiver of Embodiment 7 of this disclosure.

FIG. 10 is a block diagram of a systematic structure of the receiver of the embodiment of this disclosure. As shown in FIG. 10, the receiver 1000 includes:

a front end configured to convert an inputted optical signal into baseband signals in two polarization states, in this embodiment, the two polarization states including an H polarization state and a V polarization state.

As shown in FIG. 10, the front end includes an oscillator laser 1010, an optical 90 deg hybrid 1001, opto-electronic (O/E) detectors 1002, 1004, 1006 and 1008, analog-to-digital converters (ADCs) 1003, 1005, 1007 and 1009, a dispersion compensator 1012, an equalizer 1013 and a measurement apparatus 1011 for residual direct-current components; wherein, the measurement apparatus 1011 for residual direct-current components may have a structure and functions identical to those described in Embodiment 5 or 6, and will not be described herein any further; the oscillator laser 1010 is configured to provide a local light source; an optical signal is converted into a baseband signal in a polarization state after passing through the optical 90 deg hybrid 1001, the opto-electronic (O/E) detectors 1002 and 1004, and the analog-to-digital converters (ADCs) 1003 and 1005; and the optical signal is converted into a baseband signal in another polarization state after passing through the optical 90 deg hybrid 1001, the opto-electronic (O/E) detectors 1006 and 1008, and the analog-to-digital converters (ADCs) 1007 and 1009, with a detailed process being similar to that in the prior art, and being not going to be described herein any further.

Furthermore, if a frequency difference and phase noise have effect on estimation of an OSNR, the receiver 1000 may further include a frequency difference compensator and a phase noise compensator (not shown). And the structure of the receiver 1000 shown in FIG. 10 is illustrative only, and in particular implementation, some components may be added or removed as demanded.

With the receiver of the embodiment of this disclosure, the residual direct-current components of the optical transmitter may be measured accurately at the receiver end of the coherent optical communication system, thereby avoiding a diagnosis error of a communication network, and improving the performance of the communication system. And by measuring the residual direct-current components by using the receiver, it not only will not change topology and software and hardware configuration of an existing network, but also is applicable to a coherent optical communication system of any modulation format.

Embodiment 8

Figure 11:
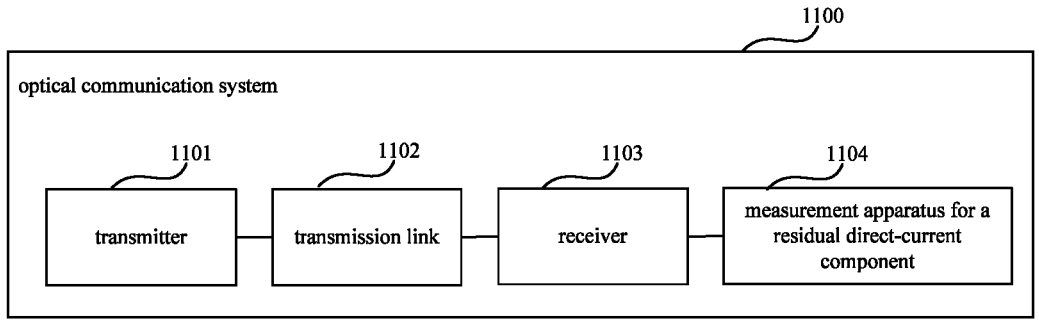
FIG. 11 is a schematic diagram of a structure of an optical communication system of Embodiment 8 of this disclosure.

This embodiment provides an optical communication system. FIG. 11 is a schematic diagram of a structure of the optical communication system of this embodiment. As shown in FIG. 11, the optical communication system 1100 includes a transmitter 1101, a transmission link 1102, a receiver 1103 and a measurement apparatus 1104 for a residual direct-current component.

In this embodiment, a structure and functions of the measurement apparatus 1104 for a residual direct-current component are identical to those described in any one of embodiments 4, 5 and 6, and will not be described herein any further.

In this embodiment, the measurement apparatus 1104 for a residual direct-current component may also be integrated into the optical receiver 1103, and taken as a module of the optical receiver 1103.

In this embodiment, the transmitter 1101 and the transmission link 1102 may have structures and functions of an existing transmission link, and structures and functions of the transmitter and the transmission link are not limited in this embodiment.

With the optical communication system of the embodiment of this disclosure, the residual direct-current components of the optical transmitter may be measured at the receiver end of the coherent optical communication system, thereby avoiding a diagnosis error of a communication network, and improving the performance of the communication system. And by measuring the residual direct-current components by using the optical communication system, it not only will not change topology and software and hardware configuration of an existing network, but also is applicable to a coherent optical communication system of any modulation format.

An embodiment of the present disclosure provides a computer readable program code, which, when executed in a receiver, will cause the receiver to carry out the method described in any of embodiments 1-3.

An embodiment of the present disclosure provides a computer readable medium, including a computer readable program code, which will cause a receiver to carry out the method described in any of embodiments 1-3.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

What is claimed is:

1. A measurement apparatus for a residual direct-current component, applicable to a single-polarization optical communication system, the measurement apparatus comprising:
a memory that stores a plurality of instructions; and
a processor coupled to the memory and configured to execute the instructions to:
select a section of data of a first predetermined length from a received signal;
perform a fast Fourier transform on the selected section of data to obtain a frequency-domain signal of the data;
calculate a power spectrum of the frequency-domain signal of the data; and
find a maximum peak value of the power spectrum in a frequency offset range, and use power of the maximum peak value as power of the residual direct-current component.

2. The measurement apparatus according to claim 1, wherein the first predetermined length is less than a change period of phase noise of the optical communication system, and selection of the first predetermined length ensures that a spectral resolution is in a certain range.

3. The measurement apparatus according to claim 1, wherein the power of the maximum peak value is expressed as:

$$Pa = P_{X,N1}(f0);$$

where, X is the received signal, N1 is the first predetermined length, and f0 is a frequency at the position of the maximum peak value.

4. A measurement apparatus for residual direct-current components, applicable to a dual-polarization optical communication system, the measurement apparatus comprising:
a memory that stores a plurality of instructions; and
a processor coupled to the memory and configured to execute the instructions to:
select a section of data of a first predetermined length respectively from received signals in two polarization states;
perform a fast Fourier transform on two selected sections of data to obtain frequency-domain signals of the two sections of data;
calculate a power spectra of the frequency-domain signals of the two sections of data, and add calculated two power spectra; and
find a maximum peak value of an added power spectrum in a frequency offset range, and use power of the maximum peak value as a sum of power of the residual direct-current components.

5. The measurement apparatus according to claim 4, wherein the first predetermined length is less than a change period of phase noise of the optical communication system, and selection of the first predetermined length ensures that a spectral resolution is in a certain range.

6. The measurement apparatus according to claim 4, wherein the power Pa of the maximum peak value is expressed as:

$$Pa=P_{XY,N1}(f0);$$

where, X and Y are the received signals in the two polarization states, N1 is the first predetermined length, and f0 is a frequency at the position of the maximum peak value.

7. A measurement apparatus for residual direct-current components, applicable to a dual-polarization optical communication system, the measurement apparatus comprising:
a memory that stores a plurality of instructions; and
a processor coupled to the memory and configured to execute the instructions to:
measure a sum of power of residual direct-current components in two polarization states;
measure a difference between two state power of the residual direct-current components in the two polarization states; and
calculate component power of a residual direct-current component in each polarization state of an optical transmitter according to the sum of power and the difference between the two state power.

8. The measurement apparatus according to claim 7, wherein the processor is configured to execute the instructions to:
select a section of data of a first predetermined length respectively from received signals in the two polarization states;
perform a fast Fourier transform on two selected sections of data to obtain frequency-domain signals of the two sections of data;
calculate a power spectra of the frequency-domain signals of the two sections of data, and add calculated two power spectra; and
find a maximum peak value of an added power spectrum in a frequency offset range, and use power of the maximum peak value as a sum of the power of the residual direct-current components.

9. The measurement apparatus according to claim 8, wherein the first predetermined length is less than a change period of phase noise of the optical communication system, and selection of the first predetermined length ensures that a spectral resolution is in a certain range.

10. The measurement apparatus according to claim 8, wherein the power Pa of the maximum peak value is expressed as:

$$Pa=P_{XY,N1}(f0);$$

where, X and Y are the received signals in the two polarization states, N1 is the first predetermined length, and f0 is a frequency at the position of the maximum peak value.

* * * * *